US012131215B2

(12) United States Patent
Olchevski et al.

(10) Patent No.: US 12,131,215 B2
(45) Date of Patent: Oct. 29, 2024

(54) RADIO FREQUENCY SIGNAL MODULATION BY IMPEDANCE VARIATION

(71) Applicant: MHM Microtechnique Sàrl, Echallens (CH)

(72) Inventors: Ivan Olchevski, Geneva (CH); Stefan Meyer, Donneloye (CH); Matthieu Boubat, Lausanne (CH); Jean-Paul Sandoz, Cormondrèche (CH)

(73) Assignee: MHM Microtechnique Sàrl, Echallens (CH)

( * ) Notice: Subject to any disclaimer, the term of this patent is extended or adjusted under 35 U.S.C. 154(b) by 0 days.

(21) Appl. No.: 17/312,729

(22) PCT Filed: Nov. 14, 2019

(86) PCT No.: PCT/IB2019/059792
§ 371 (c)(1),
(2) Date: Jun. 10, 2021

(87) PCT Pub. No.: WO2020/121085
PCT Pub. Date: Jun. 18, 2020

(65) Prior Publication Data
US 2022/0027583 A1      Jan. 27, 2022

(30) Foreign Application Priority Data

Dec. 11, 2018 (EP) .................................. 18211751

(51) Int. Cl.
*G06K 7/10* (2006.01)
*G06K 7/00* (2006.01)
*G06K 19/067* (2006.01)

(52) U.S. Cl.
CPC ....... *G06K 7/10356* (2013.01); *G06K 7/0008* (2013.01); *G06K 7/10019* (2013.01); *G06K 19/0675* (2013.01)

(58) Field of Classification Search
CPC ............. G06K 7/10356; G06K 7/0008; G06K 7/10019; G06K 19/0675; G06K 7/086;
(Continued)

(56) References Cited

U.S. PATENT DOCUMENTS 5,554,974 A * 9/1996 Brady ................ G08B 13/2417
428/615
5,604,486 A * 2/1997 Lauro ................ G08B 13/2471
340/505

(Continued)

FOREIGN PATENT DOCUMENTS

JP    2006507610 A    3/2006
JP    2017203768 A    11/2017
JP    2018022357 A    2/2018

OTHER PUBLICATIONS

International Search Report & Written Opinion for PCT/IB2019/059792 dated Feb. 10, 2020, 8 pgs.

*Primary Examiner* — James J Yang
(74) *Attorney, Agent, or Firm* — Blank Rome LLP

(57) ABSTRACT

An RFID tag (1) is configured to transmit a predetermined code (3$_K$) as a RF backscattered radiation (2) in response to an impinging RF signal (41). The RFID tag (1) is configured to react to an impinging signal at a predetermined reference frequency (23) with a reference backscattered signal (2$_R$). The RFID tag (1) is also configured and to react to an impinging signal (41) at any of a group of transmission frequencies (21, 22) with coding backscattered signals (2$_{F-G}$) whose amplitudes (20$_A$, 20$_B$) relative to the amplitude (20$_R$) of the reference backscattered signal define the code (3$_K$). An RFID reader (4), a kit (5) and a method for transmitting a message from a device (1) to a reader (4) as a RF backscattered radiation (2) in response to an impinging RF signal (41).

9 Claims, 4 Drawing Sheets

(58) Field of Classification Search
CPC ........... G06K 19/0672; G06K 19/0724; G06K 19/07767; G06K 19/067; G06K 19/0725; G06K 19/07773
USPC ...... 340/10.1, 10.42; 455/106, 107; 375/315
See application file for complete search history.

(56) References Cited

U.S. PATENT DOCUMENTS

| | | | | |
|---|---|---|---|---|
| 5,680,106 | A * | 10/1997 | Schrott | G08B 13/2431 342/51 |
| 5,999,136 | A * | 12/1999 | Winter | H01Q 1/1271 343/906 |
| 6,104,311 | A * | 8/2000 | Lastinger | G06K 19/067 340/572.1 |
| 6,107,910 | A | 8/2000 | Nysen | |
| 8,723,640 | B2 * | 5/2014 | Hyde | A61B 5/073 340/539.12 |
| 9,973,367 | B2 * | 5/2018 | Gollakota | H04K 3/25 |
| 2004/0075560 | A1 | 4/2004 | Hartmann et al. | |
| 2005/0110614 | A1 * | 5/2005 | Coates | G06K 19/0672 340/10.41 |
| 2005/0280539 | A1 * | 12/2005 | Pettus | H01Q 21/065 340/572.1 |
| 2007/0188326 | A1 * | 8/2007 | Pluss | G06K 7/0008 340/572.4 |
| 2008/0127729 | A1 * | 6/2008 | Edmonson | G01N 29/022 73/628 |
| 2008/0135614 | A1 * | 6/2008 | Werner | G06K 7/10128 235/439 |
| 2009/0309706 | A1 | 12/2009 | Mukherjee et al. | |
| 2011/0259960 | A1 * | 10/2011 | Baarman | G06K 19/0717 235/440 |
| 2012/0161931 | A1 * | 6/2012 | Karmakar | G01S 13/825 235/492 |
| 2012/0174678 | A1 * | 7/2012 | Gallagher | H03H 9/642 29/25.35 |
| 2017/0330004 | A1 | 11/2017 | Gibson | |
| 2019/0139574 | A1 | 5/2019 | Ogawa et al. | |

* cited by examiner

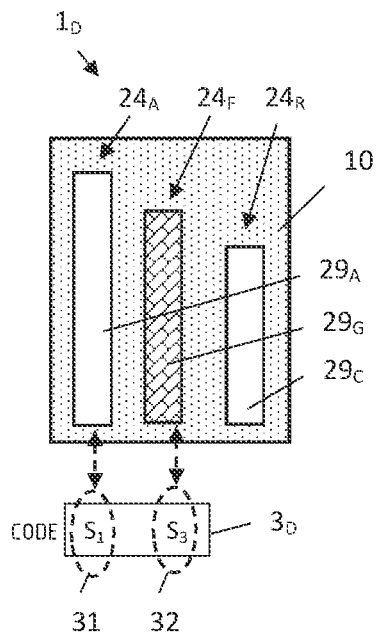
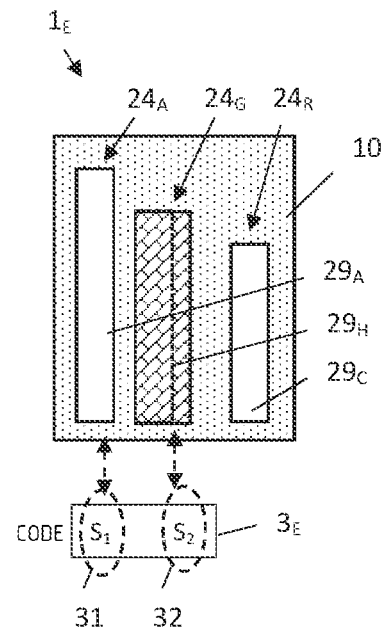
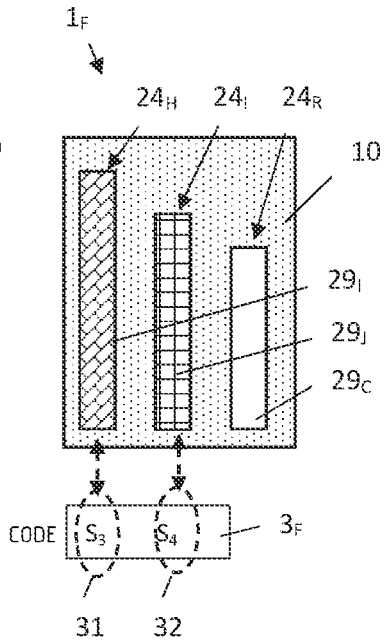
Figure 4a  Figure 4b  Figure 4c
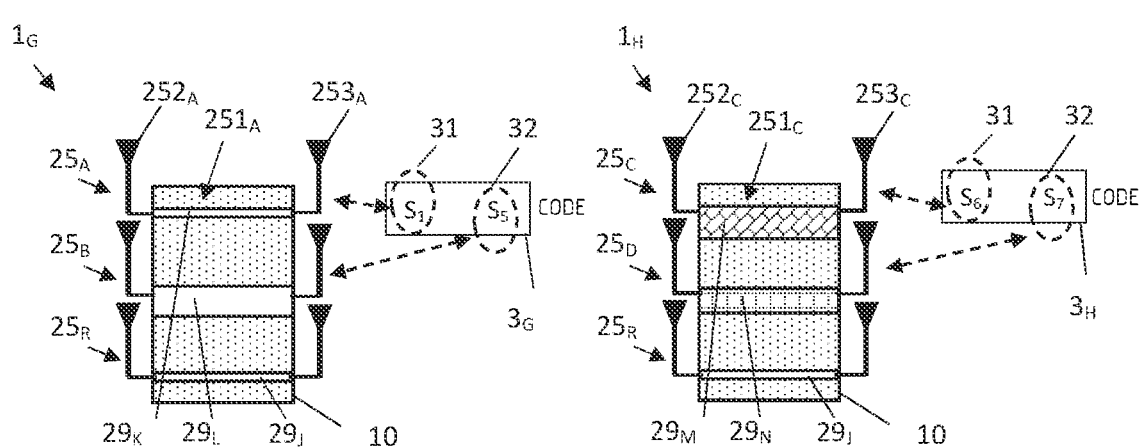
Figure 5a  Figure 5b

RADIO FREQUENCY SIGNAL MODULATION BY IMPEDANCE VARIATION

RELATED APPLICATIONS

The present application is a national phase of PCT/IB2019/059792, filed Nov. 14, 2019, which claims the benefit of European Patent Application 18211751.5, filed Dec. 11, 2018. The entire disclosures of which are hereby incorporated by reference.

FIELD OF THE INVENTION

The present invention concerns a RFID tag, notably a chipless RFID tag, and a RFID reader.

The invention also concerns a method for transmitting a message from a device to a reader as a RF backscattered radiation in response to an impinging RF signal of the reader.

DESCRIPTION OF RELATED ART

There an increasing interest in devices providing tracking of products, notably in critical domains such as nutrition, aviation and medical domains.

Radio-frequency identification (RFID) tags efficiently provide tracking of objects. In particular, unlike barcodes that require a human operator for interrogation, the identification of RFID tags relies on electromagnetic field (notably in Radio Frequency—RF), providing an automatization of the tracking of objects on which the tags are attached.

The main challenge to their adoption is the cost of RFIDs. The main costs is related to the design and fabrication of integrated circuit, notably of application-specific integrated circuit (ASIC) providing the electromagnetic field coding the identification. Todays, there is thus an increasing interest in providing RFID tags devoid of integrated circuit (also called chipless RFID tag) for reduce the unitary manufacturing cost.

The major challenges in designing chipless RFID (i.e. RFID tags that do not require a microchip in the transponder) is how to efficacy encoding and transmitting data.

Chipless RFID tags relying on time-domain reflectometry are already knows. In response of an impinging RF signal, notably in form of an interrogator pulse, these Chipless RFID tags generate echoes, wherein the timing of the pulse generation (i.e. arrival) encodes the data.

Chipless RFID tags relying on frequency signature techniques are already knows. These RFID tags are configured to attenuate up to absorb selected frequency components of an interrogator pulse, wherein the presence or absence of certain frequency components encodes the data. They may use chemicals, magnetic materials or resonant circuits to attenuate or absorb radiation of a particular frequency.

However, Chipless RFID tags relying on time-domain reflectometry or on frequency signature techniques are suitable to provide uniquely small amount of data as a coding of each bit of the data requires a dedicated echoes or frequency. Moreover, a multiplication of echoes and signatures frequencies leads not only to an increase of the dimension of the tag but also to intra-echoes or—frequencies interferences decreasing data discrimination.

BRIEF SUMMARY OF THE INVENTION

An aim of the invention is to provide a more efficient transmission of a message from a (chipless) device to a reader as a RF backscattered radiation in response to an impinging RF signal of the reader, with respect to known transmissions.

An aim of the invention is to provide a RFID tag, notably a passive or chipless RFID tag, that is except of, or at least mitigates, the drawbacks of known RFID tags. Dependent claims relate to particular advantageous embodiments of the invention.

According to the invention, these aims are achieved by means of the RFID Tag, a RFID reader, the kit, and the method, as recited in the claims.

The proposed solution provides a more efficient transmission of a message from a (chipless) device to a reader as a RF backscattered radiation in response to an impinging RF signal of the reader, as each backscattered signal is suitable to provide a symbol digitally represented by more than a single digital bit. The number of required coding frequencies can thus be reduced with respect to the number of digital bit of the data to be transmitted. Moreover, the reduction of the number of coding frequencies leads to a reduction of the dimension of the RFID tag.

In one embodiment, the code is defined by the electrical impedance of portions of antennas or electrically connected to one or more antennas. In particular these portions are portions of dipole antennas and/or resonator transmission lines and/or meander line loaded antennas and/or of any other-shaped antenna of the RFID tag. This embodiment provides an efficient encoding and transmission of data.

In one embodiment, these portions are printed on a support of the RFID tag. In a particular embodiment, the code is defined by modifying a shape, a dimension and/or a material of these printed portions.

In one embodiment, each amplitude of the coding backscattered signals relative to the amplitude of the reference backscattered signal defines a symbol of the code.

In one embodiment, the code and/or the symbol correspond and/or is represented by: one or more alphabetical symbols, one or more alphanumerical symbols, one or more numerical symbol, one or more binary digits, one or more typographical symbols, and/or one or more graphical symbols.

In one embodiment, The RFID tag is a passive RFID tag, preferably the RFID tag is a chipless RFID tag.

In one embodiment, the code is a unique identifier, preferably being assigned to the RFID tag.

The invention further concerns a method for transmitting a code from a device to a reader as a RF backscattered radiation in response to an impinging RF signal generated by the reader.

In a particular embodiment of the method, the code is a unique identifier or a digital message collected by the device.

In an embodiment of the method, the device is a RFID tag, preferably a passive RFID tag or a chipless RFID tag.

These particular embodiments furthermore provide not only an efficient encoding and transmission of data, but also a cost-effective manufacturing of the RFID tag.

BRIEF DESCRIPTION OF THE DRAWINGS

The invention will be better understood with the aid of the description of an embodiment given by way of example and illustrated by the figures, in which:

FIG. 4a-c show a view of others embodiments of RFID tags relying on dipole antennas, according to the invention;

FIG. 5a-b show a view of embodiments of RFID tags relying on resonating units, according to the invention;

DETAILED DESCRIPTION OF POSSIBLE EMBODIMENTS OF THE INVENTION

The invention relates to a cost-effective system and an efficient method for transmitting a message from a device to a reader as a backscattered radiation in response to an impinging signal generated by the reader.

In particular, the invention relates to a Radio-frequency identification (RFID) tag, notably a passive or chipless RFID tag, capable to transmit a message to a RFID reader as a RF backscattered radiation in response to a Radio Frequency (RF) impinging signal. In particular, the invention relates to a chipless RFID tag.

A RFID tag is any device attachable to an object and configured to provide a code, preferably being assigned to or collected by the device, using electromagnetic field in the Radio frequency in response of an interrogating radio wave. The code is preferably a unique identifier for identification and tracking purposes.

A passive RFID tag refers to a RFID tag configured to generate the backscattered radiation uniquely from (energy provided by) the interrogating radio wave, i.e. devoid of energy source for storing and/or transmitting the given code.

A Chipless RFID tag refers to a RFID tag devoid of integrated circuit, e.g. devoid of transistors, for storing and/or transmitting a given code.

Radio Frequency refers to an oscillation rate (frequency) of an electromagnetic field in the frequency range from 20 kHz to 300 GHz.

Figure 1:
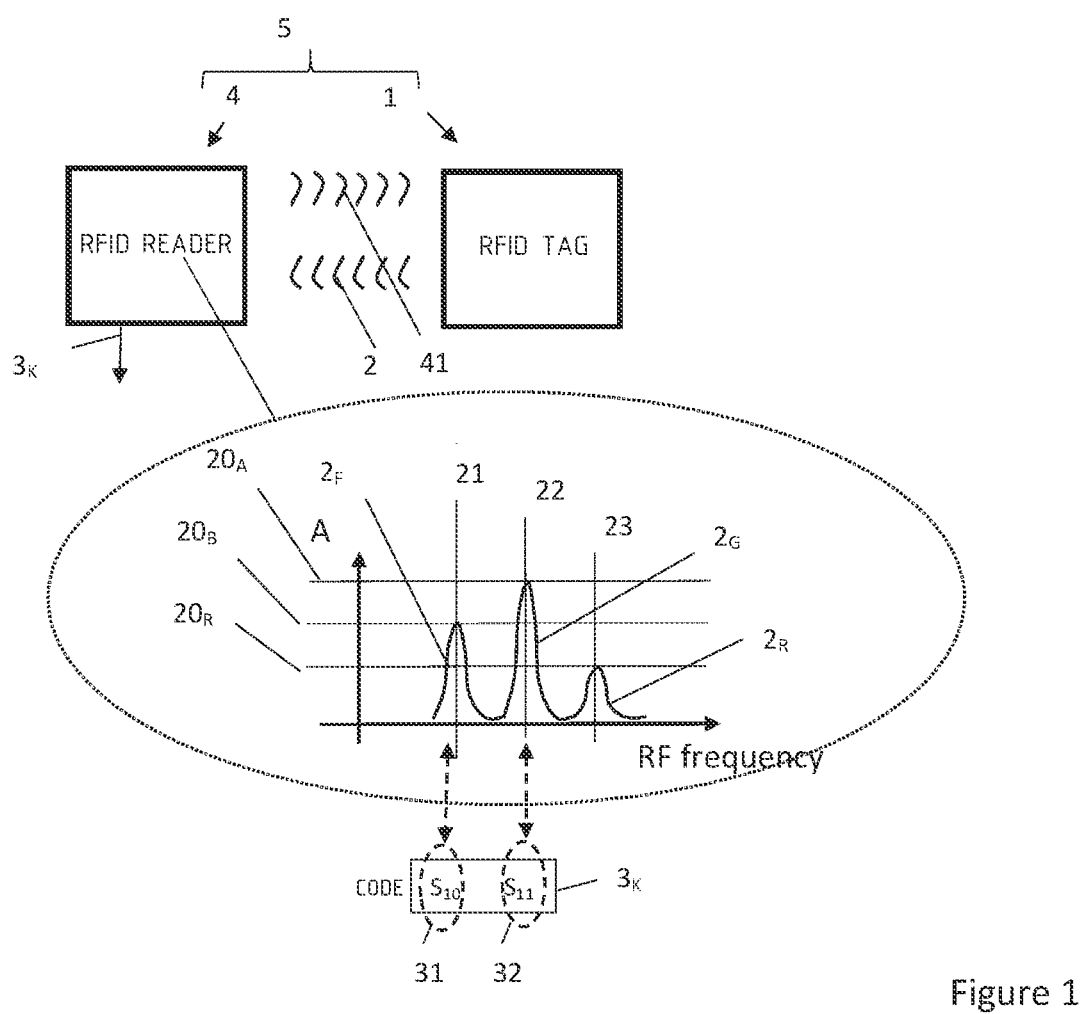
FIG. 1 shows an exemplary view of a communication system comprising an RFID tag and a RFID reader, according to the invention.

FIG. 1 shows an exemplary view of a method and a system for transmitting a code $3_K$ from a device 1 to a reader 4. In particular, the device 1 is configured to provide a radio-frequency (RF) backscattered radiation 2 (i.e. a backscattered radiation having frequencies in the range of radio frequency) in response of an impinging RF signal 41 (i.e. an interrogating signal having frequencies in the range of radio frequency) generated by the reader 4.

As illustrated in FIG. 1, the device 1 is configured to:
provide a (reference) backscattered signal $2_R$ in reaction to an impinging signal at a predetermined reference frequency 23; and
provide at least a (coding) backscattered signal $2_F$, $2_G$ in reaction to an impinging signal at least a transmission frequency 21, 22, wherein the code $3_K$ is defined by comparing the amplitude $20_A$ $20_B$ of each coding backscattered signals $2_F$ with the amplitude $20_R$ of the reference backscattered signal (i.e. the backscattered signal at the predetermined reference frequency 23).

As illustrated FIG. 1, the device 1 can be configured to, in reaction to an impinging signal at whichever transmission frequency of a group of predefined distinct (i.e. different) transmission frequencies 21, 22, to provide a distinct backscattered signal $2_F$, $2_G$ at the interrogated transmission frequency. The code $3_K$ can thus be defined by the relative amplitude of each of the coding backscattered signals relative to the amplitude of the reference backscattered signal.

The code can comprise (e.g. being represented by) a series of juxtaposed symbols 31, 32, preferably the symbols being selected within a predefined list of symbols, notably comprising alphabetical symbols, alphanumerical symbols, numerical symbols, binary digits, typographical symbols, and/or graphical symbols.

The relative amplitude of each coding backscattered signal can thus (relatively to the amplitude $20_R$ of the reference backscattered signal) define a symbol 31, 32 (e.g. a single symbol up to a groups of symbols) of the code $3_K$. The provided symbol can be: one or more alphabetical symbols, one or more alphanumerical symbols, one or more numerical symbols, one or more binary digits, one or more typographical symbols, and/or one or more graphical symbols.

The position of the provided symbols in the code (juxtaposition of symbols) can be defined in relationship with (e.g. function of) their transmission frequencies (e.g. from the lower to the highest frequencies). The relationship can be determined according to a given (amplitude) unit providing a measure of the amplitude of a backscattered signal and/or with respect to a given (ratio) unit (e.g. dB) providing a ratio between two amplitudes of electromagnetic waves.

The code $3_K$ and/or a symbol thereof can be defined by providing a coding backscattered signal (at a given coding frequency) whose amplitude is greater, (substantially) equal, or smaller than the amplitude of the reference backscattered signal, the relationship (greater/equal/smaller) defining the code $3_K$ and/or a symbol.

The code $3_K$ and/or a symbol thereof can be defined by providing a coding backscattered signal (at a given coding frequency) whose amplitude is a multiple of the amplitude of the reference backscattered signal, the multiple defining the code $3_K$ and/or a symbol.

Depending on the code $3_K$, the amplitude $20_R$ of the reference backscattered signal $20_R$ is thus either the smallest or identical to smallest amplitude of the coding backscattered signals.

The code $3_K$ and/or a symbol thereof can be defined by providing a coding backscattered signal (at a given coding frequency) whose amplitude is a divisor of the amplitude of the reference backscattered signal, the divisor defining the code $3_K$ and/or a symbol. Depending on the code $3_K$, the amplitude $20_R$ of the reference backscattered signal $20_R$ is thus either the largest or identical to largest amplitude of the coding backscattered signals.

The code $3_K$ and/or a symbol thereof can be defined by providing a coding backscattered signal (at a given coding frequency) whose amplitude is a ratio of the amplitude of the reference backscattered signal, the ratio defining the code $3_K$ and/or a symbol. The amplitude $20_R$ of the reference backscattered signal $20_R$ can be advantageously defined as being either the smaller or larger amplitude the device 1 can provide.

Advantageously, the applicant found that a modification of the amplitude $20_A$, $20_B$, $20_R$ of each of said coding backscattered signals ($2_{A-E}$) relative to the amplitude $20_R$) of the reference backscattered signal can be pursued (obtained) by modifying the electrical impedance of an electrical conductive portion of the device 1, this electrical conductive portion being involved in the generation of the coding backscattered signal. In particular, these portions can be portions of antennas or are portions electrically connected to one or more antennas.

Moreover, the applicant found that a manufacturing of these electrical conductive portions by a printing process can provide a cost-efficient device. In fact, a code (e.g. a unique identifier) can be assigned to the device by printing these electrical conductive portions so as they have the desired electrical impedance, notably by dimensioning these portions and/or selecting an adequate (electrical conductive) printed material.

These portions can be printed on a (common) support, notably by serigraphy, by semiconductor lithography, by electrical conductive-inkjet printing, by 3D printing of electrical conductive material, or by a combination thereof.

The support can be a printed circuit board, or any other non conductive material such as PET (Polyethylene Terephthalate), PS (Polystyrene), PC (Polycarbonate), ABS (Acrylonitrile Butadiene Styrene), PLA (Polylactic acid), paper, cardboard or many others. The support can be a part of an existing package of an object or a part of the object itself.

The reader 4 is thus arranged to emit an interrogation RF signal 41, to receive backscattered signals 2 from the device 1, and to reconstruct a code $3_K$ encoded in the backscattered signals. In particular, the reader 4 is further arranged to:
  measure the reference amplitude $20_R$ of the reference backscattered signal $2_R$ at the reference frequency 23,
  measure the coding amplitude $20_{A-E}$ of the coding backscattered signal $2_{F-G}$ at each transmission frequency of the group of transmission frequencies 21, 22, and
  determine the code $3_K$ of the device 1 based on the coding amplitude $20_{A-E}$ relative to the reference amplitude $20_R$.

The impinging signal (interrogation RF signal) 41 can be broad-frequency impinging signal that (simultaneously) interrogating all the transmission frequencies of the group of transmission frequencies.

Advantageously, the device 1 can be a RFID tag 1, in particular a passive RFID, notably a chipless RFID tag. The code can be advantageously a unique identifier assigned to the RFID tag for identification and/or tracking purposes, notably of an object on which the RFID tag is attached. The reader can be thus a RFID reader 4.

As illustrated in FIG. 1, the RFID tag 1 is thus configured to transmit a code $3_K$ as a RF backscattered radiation 2 in response to an impinging RF signal 41. In particular, the RFID tag 1 is configured to:
  react to an impinging signal at the (predetermined) reference frequency 23 with a reference backscattered signal $2_R$, and to
  react to an impinging signal 41 at any of the group of transmission frequencies 21, 22 with coding backscattered signals $2_G$, $2_F$ whose amplitudes $20_A$, $20_B$ relative to the amplitude $20_R$ of the reference backscattered signal define the code $3_K$.

The reference frequency 23 and the transmission frequencies of the group being within the Radio Frequency (RF) range.

The group of transmission frequencies comprises at least a transmission frequency, preferably a plurality of transmission frequencies 21, 22, notably the number of transmission frequencies being a power of 2.

Figures 2A, 2B, 2C:
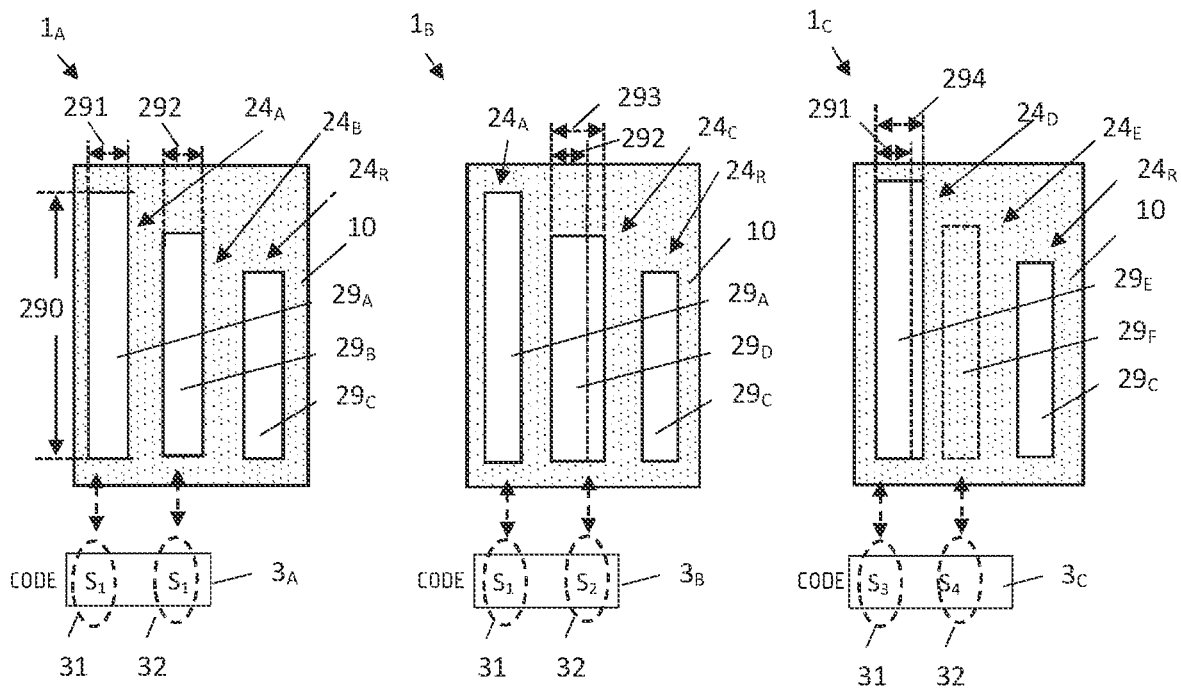
FIG. 2a-c show a view of embodiments of RFID tags relying on dipole antennas, according to the invention.
Figure 3:
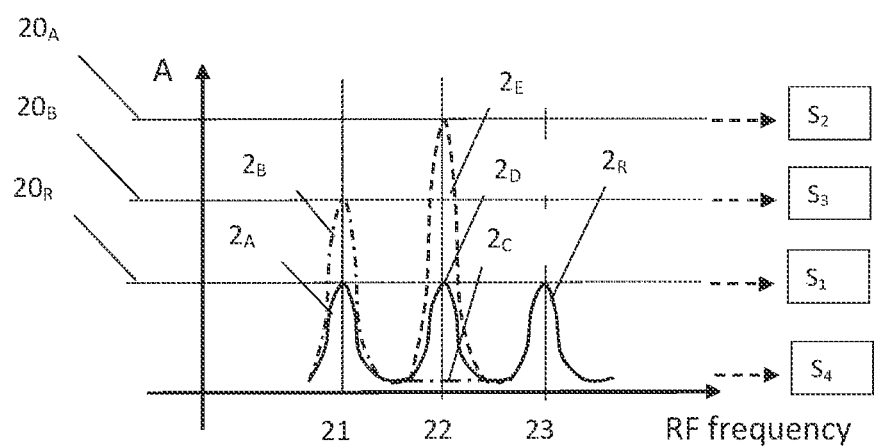
FIG. 3 shows an exemplary view of backscattered signals generated by the RFID tags of FIGS. 1a-c.

FIGS. 2a-c and 4a-c show a view of embodiments of RFID tags relying on dipole antennas, while FIG. 3 shows the related backscattered signals. In particular, these embodiments relying on dipole antennas printed on a (common) support 10 of the RFID 1.

In these embodiments, the reference backscattered signal $2_R$ at the reference frequency 23 (cf. FIG. 3) is provided by a reference dipole antenna $24_R$.

The dimensions (in particular the length 290 of their conductive strip $29_A$-$29_F$) and the electrical impedance (of the conductive strip $29_A$-$29_F$) of each dipole antenna $24_A$-$24_E$, $24_R$ determine the frequency at which the dipole antenna reacts (i.e. the reference frequency) as well as with what intensity (i.e. amplitude attenuation).

As illustrated in FIG. 2a, the reference dipole antenna $24_K$, notably the length of his conductive strip $29_C$, can thus be dimensioned so as to react to a (predefined) reference frequency, while his electrical conductivity can be selected so as to provide a given reference amplitude attenuation. The width and the electrical conductivity of the conductive strip $29_C$ determine the electrical conductivity of the reference dipole antenna $24_R$.

The RFID of FIG. 2a is configured to provide a plurality of backscattered signals $2_A$, $2_D$ at given (transmission) frequencies 22, 23 (cf FIG. 3), each backscattered signal being generated by a (coding) dipole antenna $24_A$, $24_B$ so as to define a given code $3_A$.

In this exemplary embodiment, the code $3_A$ is represented by a juxtaposition of (a same) symbol $S_1$, the symbol $S_1$ being (in this example) defined by a backscattered signal having (substantially) the same amplitude as the amplitude of the reference backscattered signal $2_R$. By the term substantially the same amplitude, it is meant an identical amplitude or a similar amplitude (e.g. a difference less than variations in the backscattered signal due to components manufacturing errors, notably antenna manufacturing errors, thermal errors, reader uncertainty or ambient noise).

The RFID tag of FIG. 2a can thus transmit the code $3_A$ (in response of an impinging signal) by means of a first and a second backscattered signal $2_A$, $2_D$ having (substantially) the same amplitude as the reference amplitude $20_R$ of the reference backscattered signal $2_R$ provided by the reference dipole antenna $24_R$. (cf. FIG. 3).

In the exemplary embodiments of FIGS. 2b and 3b, the code $3B$, $3_C$ assigned to the RFID tag 1 comprises at least a symbol $S_2$, $S_3$, $S_4$ being defined by an amplitude $20_A$, $20_B$ being different (i.e. larger or smaller) than the reference amplitude $20_R$ (cf. FIG. 3).

A modification of amplitude of the backscattered signal can be provided by modifying the electrical impedance of the related coding dipole antenna $24_C$, notably by modifying the dimensions of the conductive strip $29_D$, $29_E$, $29_F$ of (related) the dipole antenna.

As illustrated in FIGS. 2b and 2c, in particular, an increase of the amplitude can be obtained by enlarging the width 293, 294 of the conductive strip $29_D$, $29_E$ of the dipole antenna that leads to a decrease of the electrical impedance of the dipole antenna.

Similarly, as illustrated in FIG. 2c, in particular, a decrease of the amplitude can be obtained by reducing the width of the conductive strip $29_E$ (even up to a complete elimination the strip) of the dipole antenna that leads to an increase of the electrical impedance of the dipole antenna.

Alternatively or complementarily, as illustrated in the exemplary embodiments of FIGS. 4a-4c, an increase or a decrease of the amplitude can be obtained using another material for manufacturing (e.g. printing the conductive strip $29_G$-$29_J$ of) the dipole antenna, the material having another electrical resistivity (also called specific electrical resistance).

The printable material can be a conductive metal, a conductive ceramic and/or a conductive polymer, such as heated to liquid state metals (e.g. copper or aluminium), any metal or carbon doped inks (e.g. silver and silver chloride inks or epoxies) or melted polymers (e.g. carbon doped polylactic acid—PLA).

These particular embodiments furthermore provide not only an efficient encoding and transmission of data, but also a cost-effective manufacturing of the RFID tag as a given code can be assigned to the RFID by printing particular shaped and/or dimensioned dipoles antenna with one or more printable materials having different electrical resistivity.

Alternatively, or complementarily, backscattered signals can be provided by a group of resonating units $25_A$-$25_D$ and $25_R$, as illustrated in FIGS. 5a and 5b.

The RFID tag 1 can thus comprises a group of resonating units comprising:
- a reference resonating unit $25_R$ with a resonator transmission line $29_J$ electrically connected between two antennas, the reference resonating unit $25_R$ providing the reference backscattered signal $2_R$; and
- one or more coding resonating units $25_{A-D}$, each comprising a resonator transmission line $251_A$, $251_C$ electrically connected between two antennas $253_A$, $253_C$; each coding resonating unit providing one coding backscattered signal at one transmission frequency of the group of transmission frequencies 22, 23.

In particular, at least a portion (preferably the entire) resonator transmission line of each resonating unit is advantageously printed on a (same) support 10 of the RFID tag.

Each antenna of each resonating unit is advantageously a monopole antenna.

A code $3_{G-H}$ can be assigned to the RFID tag 1 by means of one or more resonator transmission lines whose electrical inductivities provide, in response of an impinging signal, coding backscattered signals with predefined amplitudes with respect to the reference amplitude (of the reference backscattered signal). As previously described, desired electrical inductivity can be obtained (notably during the printing process) by dimensioning each resonator transmission line, notably the length and/or the width thereof (e.g. lines $29_L$ and $29_M$) and/or by selecting an adequate material having a particular electrical resistivity (e.g. lines $29_M$ and $29_N$).

Figure 6:
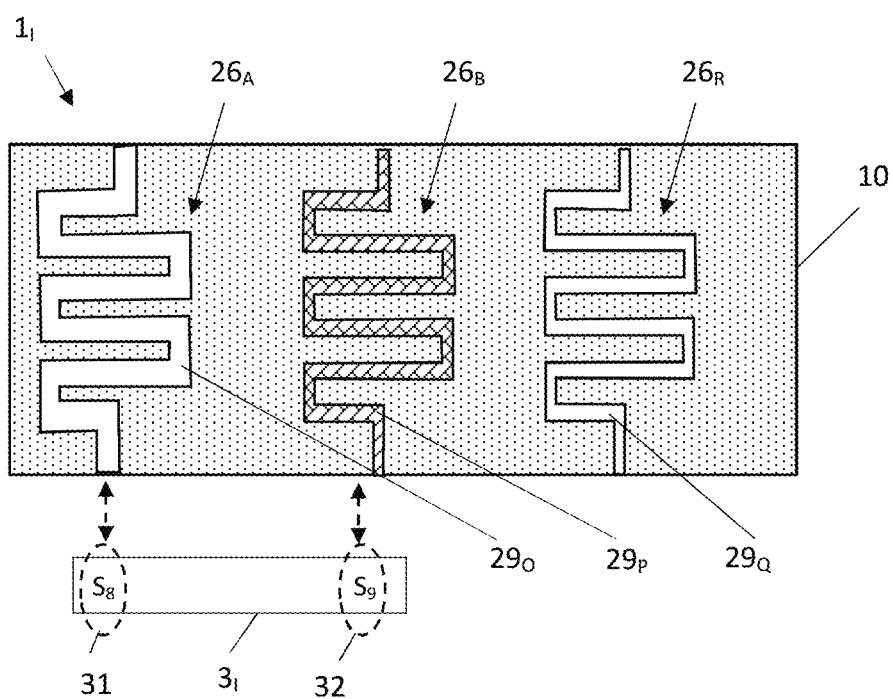
FIG. 6 shows a view of an embodiment of a RFID tag relying on meander line loaded antennas, according to the invention.

Alternatively or complementarily, backscattered signals can be provided by a group of meander line loaded antennas $26_{A-B}$, $26_R$, as illustrated in FIG. 6.

The RFID tag 1 can thus comprise a group of meander line loaded antennas $26_{A-B}$, $26_R$ comprising:
- a reference meander line loaded antenna $26_R$ providing the reference backscattered signal $2_R$, and
- one or more coding meander line loaded antennas $26_{A-B}$, each coding meander line loaded antenna providing one coding backscattered signal at one transmission frequency of the group of transmission frequencies 22, 23.

In particular, at least a portion $29_O$, $29_P$, $29_Q$ of meander line loaded antennas, the portion being located between the antennas, is advantageously printed on a (same) support 10 of the RFID tag. Preferably, the entire meander line loaded antenna is printed on the support.

A code $3_{G-H}$ can be thus assigned to the RFID tag 1 by means of one or more meander line loaded antennas whose electrical inductivities provide, in response of an impinging signal, coding backscattered signals with predefined amplitudes with respect to the reference amplitude (of the reference backscattered signal).

The desired electrical inductivity can be obtained (notably during the printing process) by:
- selecting a shape of the meander line loaded antenna, notably the number of meanders; and/or by
- dimensioning the (selected) shape, notably the length and/or the width of the meaner (e.g. meander lines $29_O$) and/or by
- using a material with a particular electrical resistivity (e.g. meander line $29_P$).

Alternatively or complementarily, backscattered signals can be provided by other antennas having other geometrical shape, such as spiral-shaped antennas, notably having geometrical shape being entirely or at least partially printable on a support.

A code 3 can be thus assigned to the RFID tag by means of one or more of such antennas whose electrical inductivities provide, in response of an impinging signal, coding backscattered signals with predefined amplitudes with respect to the reference amplitude (of the reference backscattered signal).

The desired electrical inductivity can thus be obtained (notably during the printing process) by:
- selecting a particular shape of the antenna, notably between a catalogue of different shapes; and/or by
- dimensioning the (selected) shape, notably the length and/or the width of the printable portion of the antenna, and/or by
- using a material with a particular electrical resistivity, notably selected within a catalogue of printable materials.

NUMERICAL REFERENCES USED IN THE DRAWINGS $1_{A-I}$ RFID tag
10 Support
2 RF backscattered radiation
$2_{A-G}$ Backscattered signal
$2_R$ Reference Backscattered signal
$20_{A-B}$ Amplitude
$20_R$ Reference amplitude
21 $1^{st}$ Radio Frequency
22 $2^{nd}$ Radio Frequency
23 Reference Radio Frequency
$24_{A-K}$ Dipole antenna
$24_R$ Reference dipole antenna
$25_{A-D}$ Resonating unit
$251_A$, $251_C$ Resonator transmission line
$252_A$, $252_C$ Antenna
$253_A$, $253_C$ Antenna
$25_R$ Reference resonating unit
$26_{A-B}$ Meander line loaded antenna
$26_R$ Reference Meander line loaded antenna
$29_{A-Q}$ Printed electrical conductive portion
290 Length
291-294 Width
$3_{A-K}$ Code
31, 32 Symbol
4 RFID reader
41 RF signal
5 Kit
$S_{1-11}$ Symbol

The invention claimed is:

1. A method for transmitting a code comprising a series of juxtaposed symbols from a device to a reader as a RF backscattered radiation comprising:
   providing an RFID tag device configured to transmit RF backscattered radiation in response to an impinging RF signal,
   emitting with the reader a reference interrogation RF signal at a reference frequency to the RFID tag, receiving a reference backscattered signal at the reference frequency from the RFID tag in the reader, emitting with the reader at least a transmission signal at one trans mission frequency to the RFID tag, the transmission frequency being different from the reference frequency, receiving at least a coding backscattered signal at the transmission frequency from the RFID tag in the reader, comparing an amplitude of the reference backscattered signal with an amplitude of the coding backscattered signal, defining a symbol based on whether the amplitude of the reference backscattered signal is greater, equal, or smaller than the amplitude of the coding backscattered signal, wherein the symbol represents more than one digital bit.

2. The method of claim 1, comprising emitting a plurality of transmission signals at different transmission frequencies, receiving a corresponding plurality of coding backscattered signals, comparing amplitudes of the coding backscattered signals with the amplitude of the reference backscattered signal, defining for each coding backscattered symbol based on whether the amplitude of the reference backscattered signal is greater, equal, or smaller than the amplitude of the coding backscattered signal.

3. The method of claim 2, comprising determining the position of the symbols in the message based on the corresponding transmission frequencies.

4. The method of claim 2, wherein the RFID tag device has an antenna comprising, or connected to, an electrically conductive portions of the RFID device whose impedances are such that the amplitude of each the coding backscattered signals relative tithe amplitude of the reference backscattered signal yields the symbols of the code.

5. The method of claim 4, wherein said electrically conductive portions are part of one of: a dipole antenna, a resonator transmission line electrically connected between two antennas, and/or of meander line loaded antenna.

6. The method of claim 4, comprising printing the said electrically conductive portions on a support of the RFID tag device.

7. The method of claim 1, wherein the RFID tag device comprises at least one coding resonating unit each comprising a resonator transmission line connected between two antennas, the at least one coding resonating unit providing the coding backscattered signal at the transmission frequency.

8. The method of claim 1, wherein the RFID tag device comprises at least one meander line-loaded antenna, the at least one meander line-loaded antenna providing the coding backscattered signal at the transmission frequency.

9. A combination of a RFID device and reader configured to carryout the method of claim 1.

* * * * *